United States Patent
Raj et al.

(10) Patent No.: US 10,715,427 B2
(45) Date of Patent: Jul. 14, 2020

(54) DETERMINING ROUTING DECISIONS IN A SOFTWARE-DEFINED WIDE AREA NETWORK OVERLAY

(71) Applicant: Hewlett Packard Enterprise Development LP, Houston, TX (US)

(72) Inventors: Anil Raj, Bangalore (IN); Keshava Ayanur, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/965,558

(22) Filed: Apr. 27, 2018

(65) Prior Publication Data

US 2019/0334813 A1   Oct. 31, 2019

(51) Int. Cl.
| H04L 12/753 | (2013.01) |
| H04L 12/715 | (2013.01) |
| H04L 12/46 | (2006.01) |
| H04L 12/755 | (2013.01) |
| H04L 12/24 | (2006.01) |

(52) U.S. Cl.
CPC .......... *H04L 45/48* (2013.01); *H04L 12/4633* (2013.01); *H04L 45/021* (2013.01); *H04L 45/64* (2013.01); *H04L 41/12* (2013.01)

(58) Field of Classification Search
CPC ... H04L 45/48; H04L 12/4633; H04L 45/021; H04L 45/64; H04L 41/12; H04L 45/507; H04L 45/02; H04L 45/30; H04L 45/50; H04L 45/22
See application file for complete search history.

(56) References Cited

U.S. PATENT DOCUMENTS

| 10,237,189 B2 * | 3/2019 | Garcia-Luna-Aceves ................... H04L 47/17 |
| 2014/0092762 A1 * | 4/2014 | Punati .................. H04L 45/123 370/252 |
| 2016/0262044 A1 | 9/2016 | Calin et al. |
| 2017/0012816 A1 | 1/2017 | Park et al. |
| 2017/0289027 A1 | 10/2017 | Ratnasingham |
| 2017/0324629 A1 | 11/2017 | Iyer et al. |

(Continued)

OTHER PUBLICATIONS

Cato—Networks, "MPLS, SD-WANs, and the Promise of N+SaaS", (Web Page), Retrieved Dec. 12, 2017, 14 Pgs.

(Continued)

*Primary Examiner* — Kibrom T Hailu
(74) *Attorney, Agent, or Firm* — Hewlett Packard Enterprise Patent Department

(57) ABSTRACT

Some examples relate to determining routing decisions in a SD-WAN overlay. In an example, a controller in a SD-WAN overlay comprising a plurality of network nodes may receive respective routing and link information from a respective routing agent present on each network node of the plurality of network nodes. The controller may generate a Prefix tree based on the respective routing and link information received from the respective routing agent. The prefix tree may store prefixes along with respective prefix information. The controller may determine, for each prefix in the Prefix tree, a respective routing decision for each network node in the plurality of network nodes. The controller may distribute the respective routing decision to each network node in the plurality of network nodes in the SD-WAN overlay.

20 Claims, 8 Drawing Sheets

(56) References Cited

U.S. PATENT DOCUMENTS

2018/0262599 A1* 9/2018 Firestone ................ H04L 49/70
2019/0036808 A1* 1/2019 Shenoy ................ H04L 45/123

OTHER PUBLICATIONS

Labrovic, L., MPLS or SD-WAN—Which is Better?, (Web Page), Nov. 9, 2017, 7 Pgs.
WAN Routing: Get the Best Business Value from Applications, (Web Page), Retrieved Nov. 14, 2017, 6 Pgs.

* cited by examiner

| Root | Destination Node | Cost |
|---|---|---|
| N1 | N2 | 10 |
| | N3 | 10 |
| | N4 | 20 |
| | N5 | 100 |
| | N6 | 110 |
| | N7 | 110 |
| | N8 | 120 |

DETERMINING ROUTING DECISIONS IN A SOFTWARE-DEFINED WIDE AREA NETWORK OVERLAY

BACKGROUND

A wide area network (WAN) may connect individual machines or local area networks (LANs) over a long distance. WANs may be used to connect multiple business locations. WANs may allow companies to centralize or outsource IT infrastructure rather than host servers at each business location.

BRIEF DESCRIPTION OF THE DRAWINGS

For a better understanding of the solution, examples will now be described, with reference to the accompanying drawings, in which:

FIG. 4 illustrates an example cost table for a network node;

DETAILED DESCRIPTION

Figure 1:
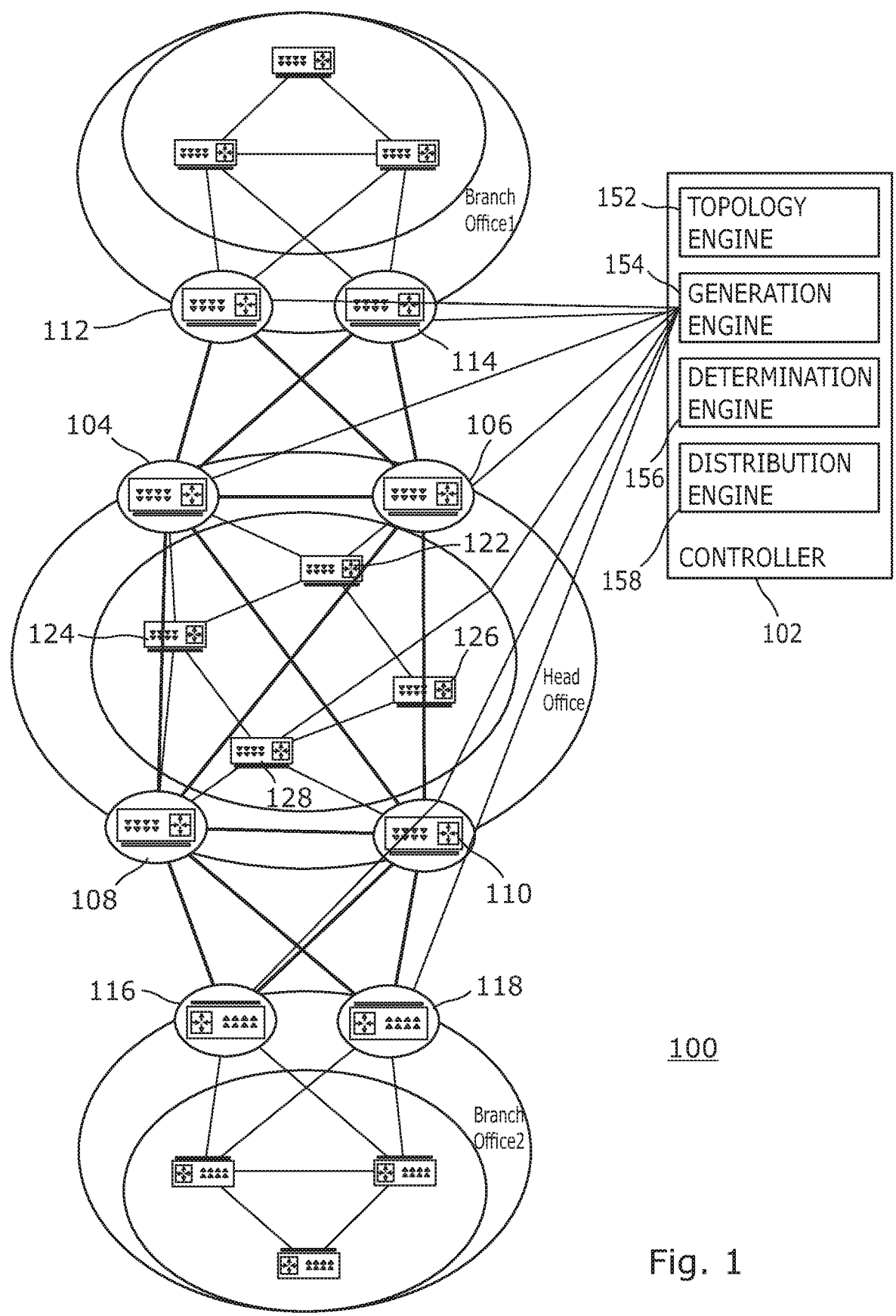
FIG. 1 is a block diagram of an example computing environment for determining routing decisions in a Software-Defined Wide Area Network (SD-WAN) overlay.

WANs may allow organizations to extend their computer networks over large distances, for example, to connect remote branch offices to data centers and each other. However, extending networks over large distances and sometimes across multiple carriers' networks may face operational such as network congestion, jitter, packet loss, etc. Software-defined networking in a wide area network (SD-WAN) may be used to address these challenges.

SD-WAN may simplify the management and operation of a WAN by decoupling (separating) the networking hardware from its control mechanism. SD-WAN solutions may employ centrally managed WAN edge devices placed in branch offices to establish logical connections with other branch edge devices across a physical WAN. SD-WAN may be used to automatically balance workloads across multiple connections, maximize cost-efficiencies while optimizing applications and traffic across multiple uplinks.

An SDN overlay is a deployment method for network virtualization and software-defined networking (SDN) that involves running a logically separate network or network component on top of an existing infrastructure (e.g., an underlay physical network). An SD-WAN overlay is a type of SDN overlay. In an overlay network, an enterprise may prefer to control packet routing (for example, to suit network topology, to accommodate priorities, for load balancing and path preferences) instead of allowing a service provider (e.g., a Multiprotocol Label Switching (MPLS) service provider) to manage the packet routing.

Examples described herein propose a customized central route calculation solution for an SDN overlay network managed by a SD-WAN controller for IP traffic. A proposed solution may aggregate route calculations in a central SD-WAN controller for overlay network end points, allow a prefix-based priority calculation, and dynamically update a forwarding table on each node depending on network changes. A proposed solution describes a customized routing solution for the overlay endpoints in an SDN overlay network that may accommodate customer policies, and priorities.

To address these technical challenges, the present disclosure describes various examples for determining routing decisions in a SD-WAN overlay. In an example, a controller in a SD-WAN overlay comprising a plurality of network nodes may receive respective routing and link information from a respective routing agent present on each network node of the plurality of network nodes. In an example, the plurality of network nodes may represent endpoints (e.g., SDN capable nodes) on the SD-WAN overlay. The endpoints may be actual physical locations, such as a network port, or they could be logical locations. The controller may generate a Prefix tree based on the respective routing and link information received from the respective routing agent. The prefix tree may store prefixes along with respective prefix information. An IP address may be logically divided into two fields, a prefix and a host identifier. In Classless Inter-Domain Routing (CIDR) notation, a prefix (or "routing prefix") may be expressed as the first address of a network, followed by a slash character (I), and ending with the bit-length of the prefix. The controller may determine, for each prefix in the Prefix tree, a respective routing decision for each network node. The controller may then distribute the respective routing decision to each network node in the SD-WAN overlay.

FIG. 1 is a block diagram of an example computing environment 100 for determining routing decisions in a Software-Defined Wide Area Network (SD-WAN) overlay.

Software defined networking (SDN) is networking paradigm in which control is decoupled from networking equipment and resides on a device called an SDN controller. The SDN controller is aware of devices and their points of interconnection in a SDN network and may perform various functions such as routing, policy implementation, receiving unknown flow packets, path resolution, flow programming, etc. SDN architecture may implemented via various protocols, for example, Border Gateway Protocol (BGP) and OpenFlow.

In an example, computing environment 100 may include a controller 102 and a plurality of network nodes 104 (N1), 106 (N2), 108 (N4), 110 (N3), 112 (N5), 114 (N6), 116 (N8), and 118 (N7). Although eight network nodes 104, 106, 108, 110, 112, 114, 116, and 118 are shown in FIG. 1, other examples of this disclosure may include more or less than eight network nodes.

Controller 102 may be any server, computing device, dedicated hardware, virtualized device, or the like. In an example, controller 102 may store and execute a computer application (machine-executable instructions). In an example, controller may include a network device (for example, a network switch). Controller 102 may communicate with network nodes 104, 106, 108, 110, 112, 114, 116, and 118 via a protocol. In an example, controller 102 may be a head end device, which may be located at headquarter or a data center of an enterprise.

In an example, controller 102 may be present in a cloud system. The cloud system may be a private cloud, a public cloud, or a hybrid cloud. The cloud system may be used to provide or deploy various types of cloud services. These may include Infrastructure as a Service (IaaS), Platform as a Service (PaaS), Software as a Service (SaaS), and so forth Controller 102 may communicate with network nodes 104, 106, 108, 110, 112, 114, 116, and 118 over a network. The network may be a wireless or wired network. The computer network may include, for example, a Wide Area Network (WAN), a Metropolitan Area Network (MAN), a Storage Area Network (SAN), a Campus Area Network (CAN), or the like. Further, the computer network may be a public network (for example, the Internet) or a private network.

Network nodes 104, 106, 108, 110, 112, 114, 116, and 118 may each include, by way of examples, a network device. Examples of the network device may include a network switch, a network router, a virtual switch, a virtual router, a VPN concentrator and a virtual internet gateway. A VPN concentrator may provide a secure creation of VPN connections and delivery of messages between VPN nodes. In an example, network nodes 104, 106, 108, 110, 112, 114, 116, and 118 may each be an SDN enabled device or complaint with OpenFlow standard. In an example, network nodes 104, 106, 108, 110, 112, 114, 116, and 118 may each be present at the head office or a branch office. In the example of FIG. 1, network nodes 104, 106, 108, 110, may each be present at a head office, network nodes 112 and 114 may each be present at a first branch office, and network nodes 116 and 118 may each be present at a second branch office.

Network nodes 104, 106, 108, 110, 112, 114, 116, and 118 may each include a routing agent (not shown). Network nodes 104, 106, 108, 110, 112, 114, 116, and 118 may each communicate with controller 102 via a protocol. In an example, a routing agent may allow the abstraction of a network node so that it can be managed by controller 102.

In an example, network nodes 104, 106, 108, 110, 112, 114, 116, and 118 may each include an edge device, which, in an example, may represent overlay endpoints for each of the network sites of an enterprise. For example, network nodes 104, 106, 108, 110, 112, 114, 116, and 118 may each represent an endpoint for an SD-WAN controlled Layer 3 Virtual Private Network (L3VPN) overlay based on Internet Protocol Security (IPsec) tunneling. IPsec is a network protocol suite that authenticates and encrypts the packets of data sent over a network. IPsec, for example, may extend private networks through creation of encrypted tunnels which secure site to site connectivity across untrusted networks. IPsec may protect data flows between a pair of hosts, between a pair of security gateways, or between a security gateway and a host. An IPsec tunnel may allow encrypted IP traffic to be exchanged between the participating entities. In an example, each network node (for example, 104, 106, 108, 110, 112, 114, 116, and 118) may represent an IPSec tunnel endpoint.

In an example, computing environment 100 may include additional network devices that are reachable or behind a network node. In the example of FIG. 1, additional network devices (for example, 122, 124, 126, and 128) may be present behind network nodes 104, 106, 108, 110, 112, 114, 116 and 118. These additional networks devices may be referred to as an internal network.

In an example, routing agent on a network node may provide routing and link information related to the network node to controller 102. Some examples of the routing information may include information related to local overlay tunnels (for example, IPsec tunnels in a node), information related to virtual LAN (VLAN) subnets learnt from a dynamic protocol (for example, OSPF), information related to static routes, and information related to routes learned via OSPF.

In an example, controller 102 may include a topology engine 152, a generation engine 154, a determination engine 156, and a distribution engine 158.

Controller 102 may be implemented by at least one computing device and may include at least engines 152, 154, 156, and 158 which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of controller 102. In some examples, the at least one machine-readable storage medium may store instructions that, when executed by the at least one processing resource, at least partially implement some or all engines of the computing device. In such examples, controller 102 may include the at least one machine-readable storage medium storing the instructions and the at least one processing resource to execute the instructions.

Topology engine 152 on controller 102 may determine an overlay network topology among a plurality of network nodes (for example, 104, 106, 108, 110, 112, 114, 116, and 118) in a computing environment (for example, 100). In an example, the computing environment 100 may be a SD-WAN overlay. An overlay network may include a virtual network that is adapted to run on top of a physical network. Network nodes (for example, 104, 106, 108, 110, 112, 114, 116, and 118) participating in an overlay network may be adapted to create and build the virtual network. An overlay network may be used, for example, in multicast communication, video and voice calls (VoIP), and peer-to-peer file sharing.

Topology engine 152 may determine network topology of an overlay network among the network nodes (for example, 104, 106, 108, 110, 112, 114, 116, and 118). In an example, topology engine 152 may determine the network topology by receiving respective routing and link information from a respective routing agent present on each network node (for example, 104, 106, 108, 110, 112, 114, 116, and 118). Each routing agent may share routing information (for example, a prefix, a cost, a source of a prefix, and next hop) and link information (for example, link, and link attributes) with topology engine 152 on controller 102. For example, the information may be obtained by topology engine 152 by exchanging link state messages with the network nodes. The routing and link information may be stored in a route database on controller 102.

A route may include a prefix (a.k.a. "routing prefix" or "network prefix"), and a prefix length (or subnet mask). For example, for a route 1.2.3.0/24, the prefix is 1.2.3.0, and the prefix length is /24 or 255.255.255.0. As used herein, the term "cost" may include a cost associated with a prefix from an advertising node. As used herein, a "source of a prefix" may refer to a source network node that injects the prefix into controller 102.

Figure 2:
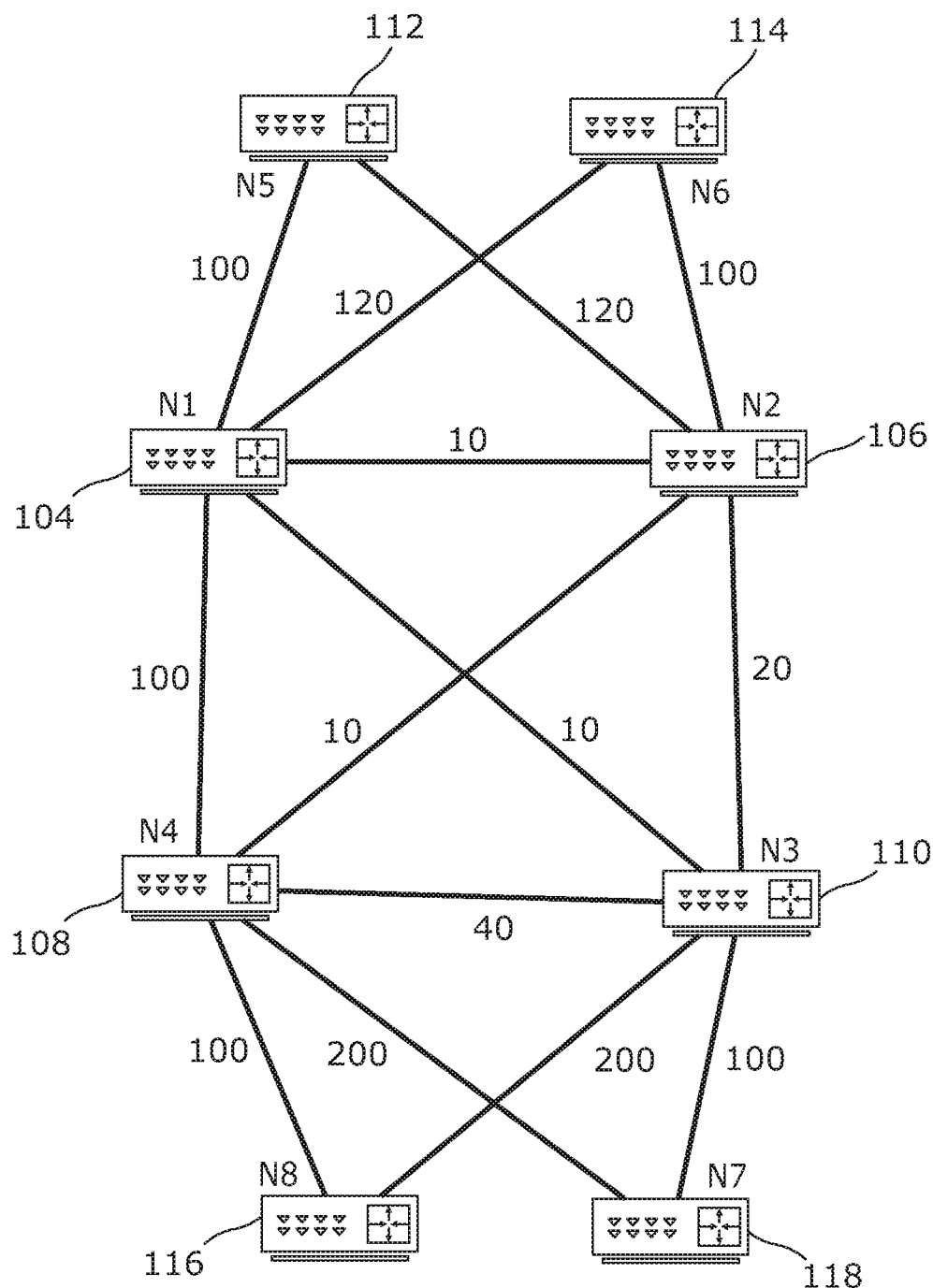
FIG. 2 illustrates an example overlay network topology graph.

On receiving the link state messages, topology engine 152 may build an overlay network topology graph. An example overlay network topology graph 200 is illustrated in FIG. 2.

In an example, topology engine 152 may discover all the routes that are reachable or behind a network node (an overlay endpoint) via the routing information received from the routing engine present on the network node. The routes from an internal network may be shared by network nodes with controller 102. Topology engine 152 may summarize these routes so that the number of routes to be distributed in the network can be effectively reduced. For example, if routes 10.1.0.0/16 and 10.0.0.0/8 are learnt from node 112, controller may summarize those routes into a single route 10.0.0.0/8, and install the summarized route.

The routes learnt by topology engine 152 may be added to a route database on controller 102. A network node may send Route-Update message to controller 102 dynamically as and when new routes are added or deleted in the node. Topology engine 152 may keep updating routes in the route database.

Figure 3:
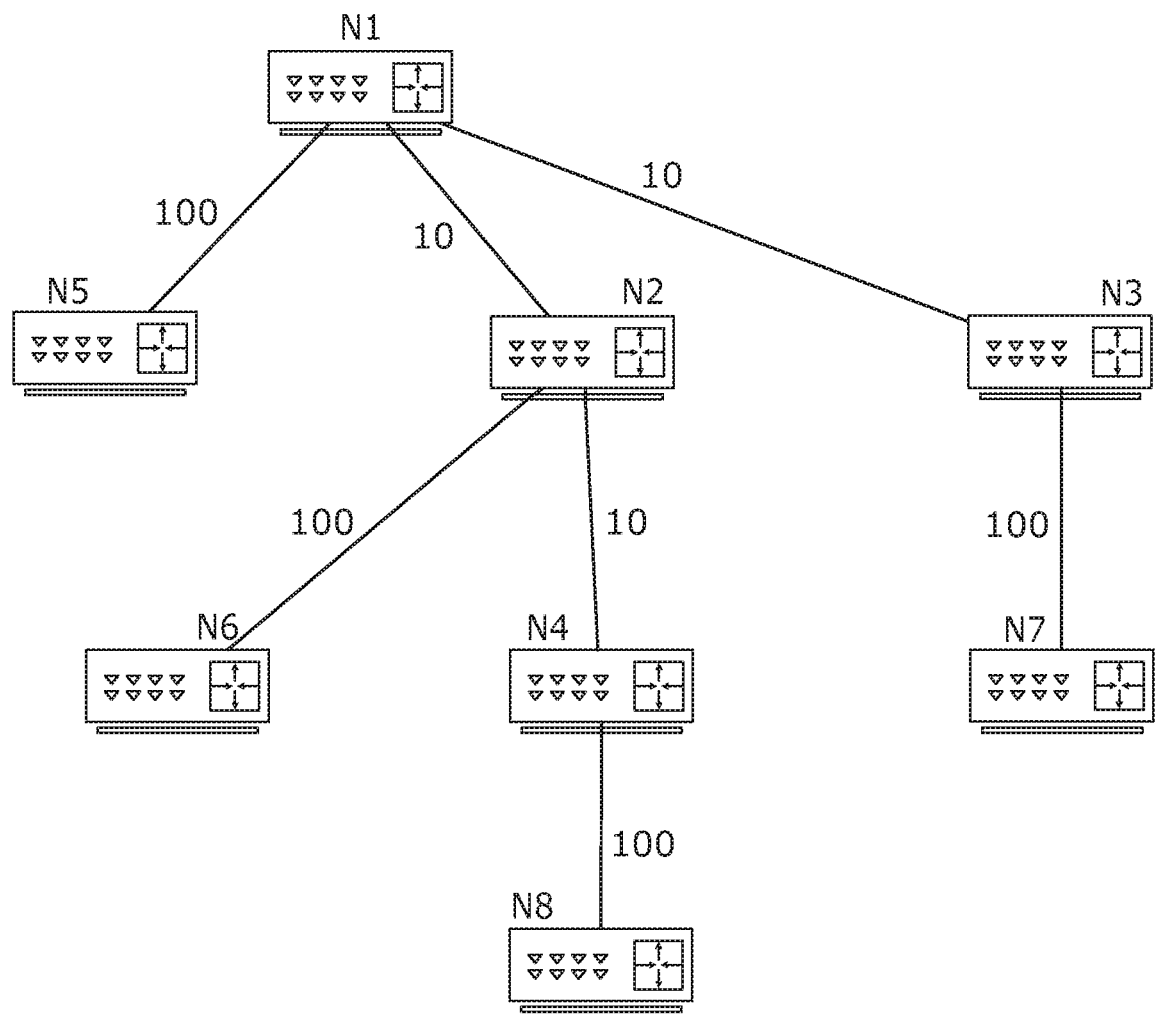
FIG. 3 illustrates an example root graph for a network node.

Link information may include connectivity information between a set of network nodes and the cost associated with the link between the two. Topology engine 152 may use the link information to build a root graph. The root graph may be used to find the best next hop, which corresponds to the least cost path to a destination. In an example, topology engine 152 may use a routing algorithm (for example, Shortest Path First (SPF) algorithm) to compute the least cost path between a root network node and another network node in the network. Any of the network nodes (for example, 104, 106, 108, 110, 112, 114, 116, or 118) may be considered as the root network node. Topology engine 152 may then calculate the cost to reach a root network node from other network nodes. FIG. 3 illustrates an example root graph 300 for network node N1.

Based on a root graph, topology engine 152 may generate a cost table for each of the network nodes (for example, 104, 106, 108, 110, 112, 114, 116, and 118) in the overlay network. A cost table may indicate a cost of reaching a root node from each of the other nodes in the overlay network. A separate cost table may be generated for each node in the overlay network. FIG. 4 illustrates an example cost table 400 for network node N1.

Generation engine 154 may generate a Prefix tree based on the routing and link information received by topology engine 152. As used herein, the Prefix tree may refer to a data structure that may be used to perform IP lookup. In an example, the Prefix tree may include a binary search tree, which may be used for storing routing prefixes. The prefix tree may specify a base IP address and a length. The length may include the number of bits that may be applied to the base to determine the network prefix. A prefix in a routing table may define a path in the Prefix tree, which begins at the root and ends at some node. Each node in the Prefix tree may represent one prefix of a routing table. A leaf in the Prefix tree may correspond to some prefix, and its value may represent the next hop of the prefix.

Figure 5:
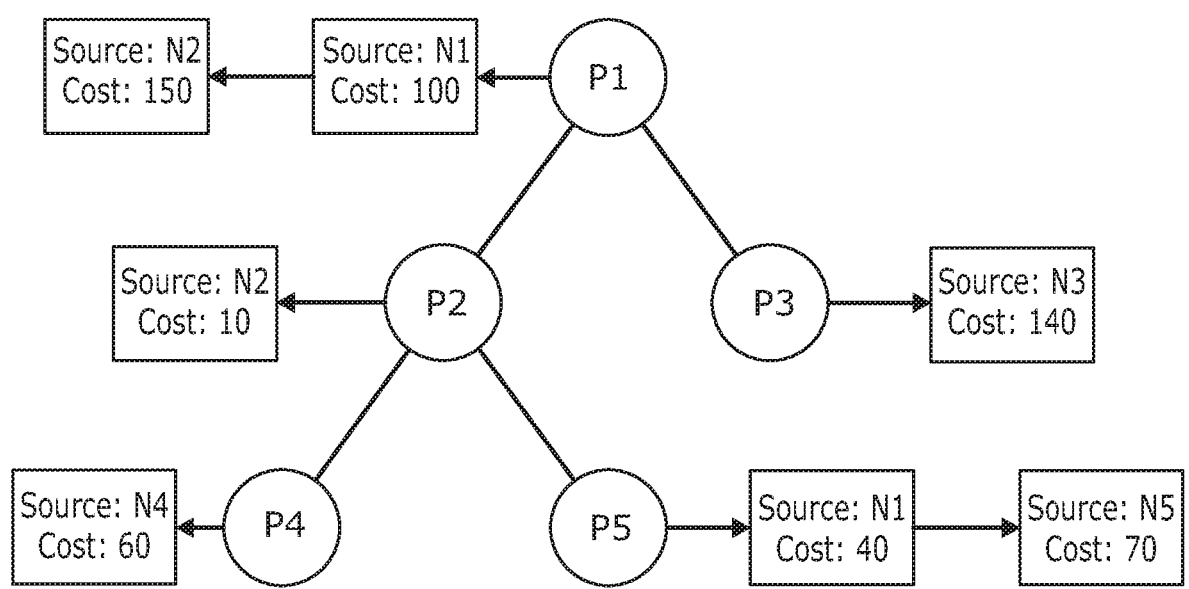
FIG. 5 illustrates an example Prefix tree.

Each prefix in the prefix tree may be associated with respective prefix information. In an example, the prefix information for a prefix may include a source of the prefix, which may refer to a source network node that presented the prefix into controller 102, and a cost associated with the prefix from the source network node. The source network node may advertise the cost associated with a prefix to controller 102. If same prefix is learned from multiple nodes, the prefix may have multiple sources associated with it along with a respective cost. FIG. 5 illustrates an example prefix tree 500.

In an example, generation engine 154 may assign a priority to a prefix in a prefix tree. For example, the priority may be assigned based on the importance of an application (e.g., a VoIP) associated with a particular prefix. In another example, generation engine 154 may generate multiple Prefix trees with a different base IP address at the root. In an example, generation engine 154 may assign a priority to a prefix tree(s). For example, the priority may be assigned based on the importance of an application (e.g., a VoIP) associated with a particular prefix tree. A priority to a prefix or a prefix tree may be system-defined or assigned by a user.

In an example, generation engine 154 may assign a policy to a prefix in a prefix tree. For example, the policy may be assigned based a factor such as security, user access, etc. apply, by the controller, a priority to a network node in the plurality of network nodes. In an example, generation engine 154 may update a status of a prefix in the Prefix tree to one of an active status and an inactive status. This may be performed by associating a periodic (or one time) prefix on/off timer with a given prefix in the Prefix tree.

In an example, generation engine 154 may update a link between two network nodes in the plurality of network nodes to one of an active status and an inactive status for a specific time period. This may be performed by associating a periodic (or one time) Link up/down timer with a given link in the node graph. In an example, generation engine 154 may update a link between two network nodes in the plurality of network nodes to one of an active status and an inactive status for a specific prefix in the Prefix tree, for a specific period. This may be performed by associating a periodic (or one time) prefix on/off timer with a given prefix in the source list associated with it or in the final route table calculated for each node.

In an example, generation engine 154 may modify a link cost between two network nodes in the plurality of network nodes for a specific time period. This may be performed by associating a periodic (or one time) cost update timer with a given prefix in the cost table for each node. In an example, generation engine 154 may associate a specific set of prefixes with specific links. This may be performed by associating specific set of routes with specific next hops in the final route table for a given node.

For each prefix in the Prefix tree, determination engine 156 may determine a respective routing decision for each network node in the SD-WAN overlay. The information related to each network node may be obtained from the topology graph. To determine a routing decision for a given prefix in the Prefix tree and for a given network node, determination engine 156 may identify for the given prefix and for the given network node, a best cost source network node as a next hop for the given prefix, from the given network node. As used herein, the term "best cost source network node" for a given prefix may refer to a source network node that has the least prefix cost. The term "prefix cost" is defined later.

To identify the best cost source network node for the given prefix for the given network node, determination engine 156 may determine a least prefix cost for the given prefix. As used herein, the "least prefix cost" for a given prefix is a least cost of reaching the given prefix from the given network node.

To determine the least prefix cost for the given prefix, determination engine 156 may determine, for each source network node of the given prefix, a prefix cost. As used herein, the "prefix cost" may refer to a cost of reaching a given prefix from a given network node considering a source network node of the given prefix. The "prefix cost" may include a sum total of a cost advertised by a given source network node of a given prefix and a cost of reaching the source network node from a given network node. The cost of reaching a source network node from a given network node may be obtained from the cost table of the given network node. To provide an example, the prefix cost of "P1", for a given network node "N2", for route N2 to N1, may be determined as follows. As illustrated in the Prefix tree of FIG. 5, P1 has two source network nodes N1 and N3 with cost 100 and 150, respectively. In this case, the prefix cost of P1, for network node N2, considering source node N3 may be calculated as follows: Prefix P1 Cost for N2=N3 Source cost for P1+N2 to N1 cost. N3 Source cost for P1, according to the Prefix tree of FIG. 5, is 150. N2 to N1 cost, according to the cost table of N1, as shown in FIG. 4, is 10. Therefore, Prefix P1 Cost for N2=150+10=160.

Once the prefix cost of each source network node of the given node is determined, determination engine 156 may compare the prefix costs. In response to the comparison, determination engine 156 may identify the least prefix cost source network node. Determination engine 156 may then select the least prefix cost source network node as the best cost source network node (or "next hop") for the given prefix, from the given network node. The best cost source network node may be referred to as the routing decision for the given prefix, for the given network node. In like manner, determination engine 156 may determine a routing decision for a given prefix, for each network node in the SD-WAN overlay. Also, in like manner, determination engine 156 may determine a respective routing decision for each prefix, for a given network node in the SD-WAN overlay.

Distribution engine 158 may distribute the respective routing decision to each network node in the plurality of network nodes in the SD-WAN overlay. In an example, a routing decision may be routed in the following format {P, Next hop, Cost}, wherein "P" refers to a prefix; "Next hop" includes the best cost source network node for the prefix P for a given node; and "Cost" refers to a cost associated with selecting Next hop for the Prefix P for the given node}.

Figure 6:
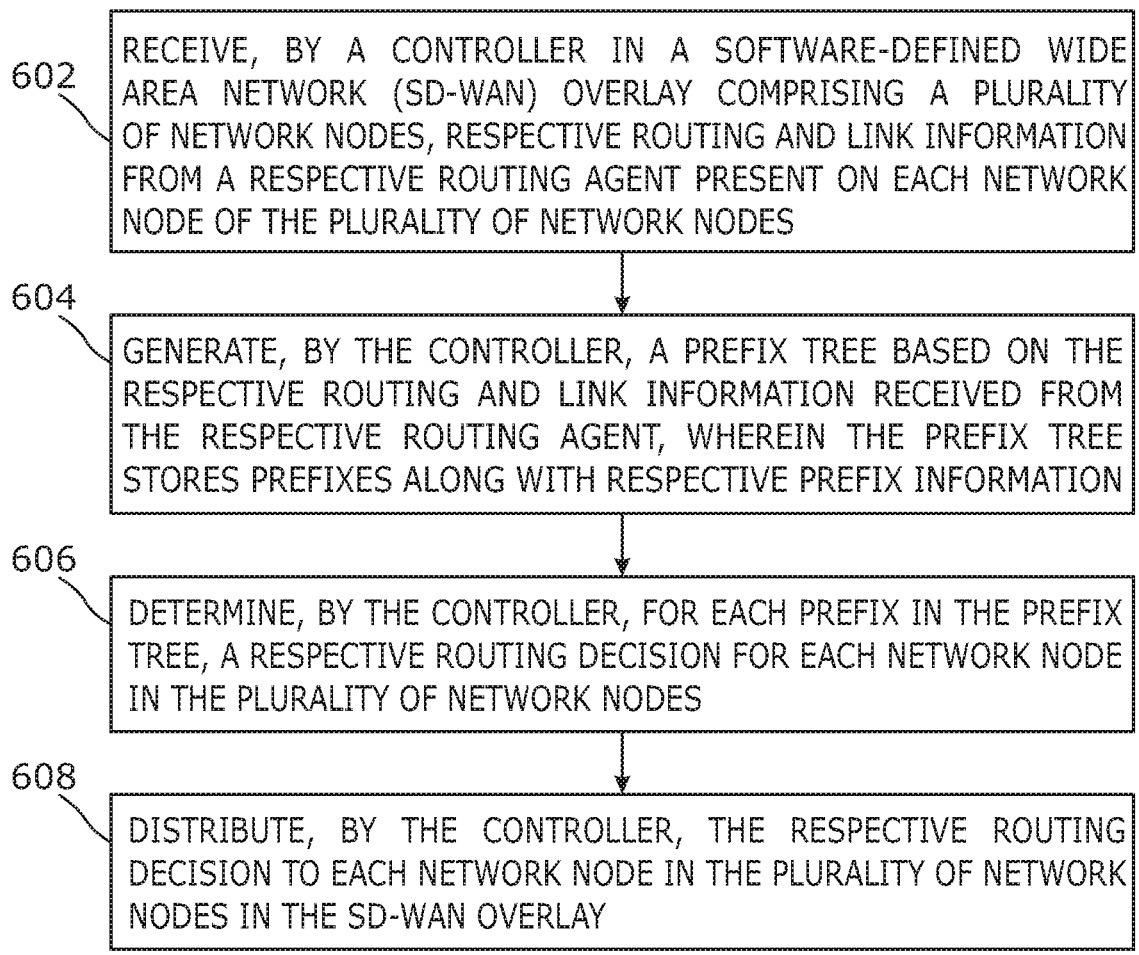
FIG. 6 is a block diagram of an example method of determining routing decisions in a SD-WAN overlay.

FIG. 6 is a block diagram of an example method of determining routing decisions in a SD-WAN overlay. The method, which is described below, may be executed on a computing device such as controller 102 of FIG. 1. However, other devices may be used as well.

At block 602, a controller in a software-defined Wide Area Network (SD-WAN) overlay comprising a plurality of network nodes may receive respective routing and link information from a respective routing agent present on each network node of the plurality of network nodes. At block 604, the controller may generate a Prefix tree based on the respective routing and link information received from the respective routing agent. The prefix tree may store prefixes along with respective prefix information. At block 606, the controller may determine, for each prefix in the Prefix tree, a respective routing decision for each network node in the plurality of network nodes. At block 608, the controller may distribute the respective routing decision to each network node in the plurality of network nodes in the SD-WAN overlay.

Figure 7:
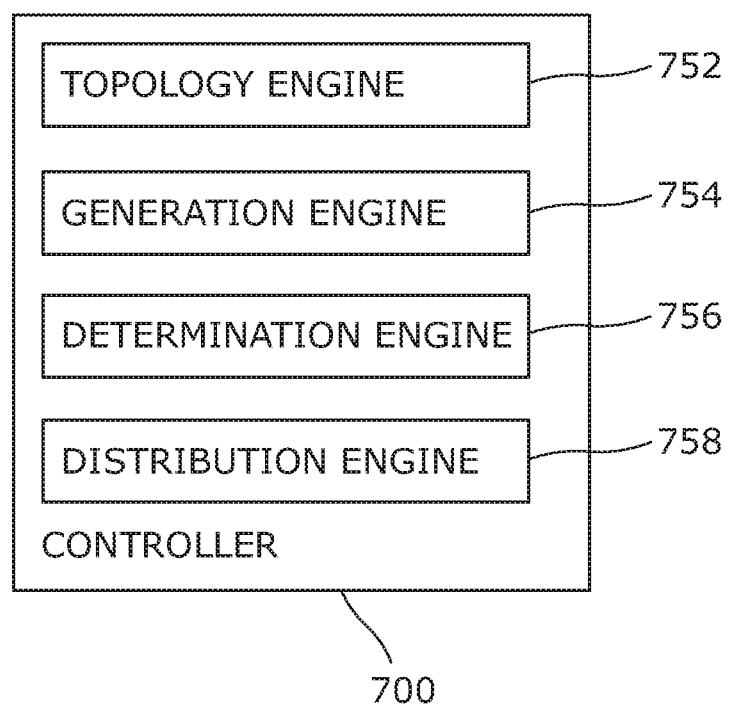
FIG. 7 is a block diagram of an example system for determining routing decisions in a SD-WAN overlay.

FIG. 7 is a block diagram of an example controller 700 for determining routing decisions in a SD-WAN overlay. In an example, controller 700 may be analogous to controller 102 of FIG. 1, in which like reference numerals correspond to the same or similar, though perhaps not identical, components. For the sake of brevity, components or reference numerals of FIG. 7 having a same or similarly described function in FIG. 1 are not being described in detail in connection with FIG. 7. Said components or reference numerals may be considered alike.

In an example, controller 700 may include a topology engine 752, a generation engine 754, a determination engine 756, and a distribution engine 758. In an example, topology engine 752, generation engine 754, determination engine 756, and distribution engine 758 may perform functionalities similar to those described earlier in reference to topology engine 152, generation engine 154, determination engine 156, and distribution engine 158 of FIG. 1, respectively.

In an example, a topology engine 752 may receive in a software-defined Wide Area Network (SD-WAN) overlay comprising a plurality of network nodes, respective routing and link information from a respective routing agent present on each network node of the plurality of network nodes. Generation engine 754 may generate a Prefix tree based on the respective routing and link information received from the respective routing agent. The prefix tree may store prefixes along with respective prefix information. Determination engine 756 may determine for each prefix in the Prefix tree, a respective routing decision for each network node in the plurality of network nodes. Distribution engine 758 may distribute the respective routing decision to each network node in the plurality of network nodes in the SD-WAN overlay.

Figure 8:
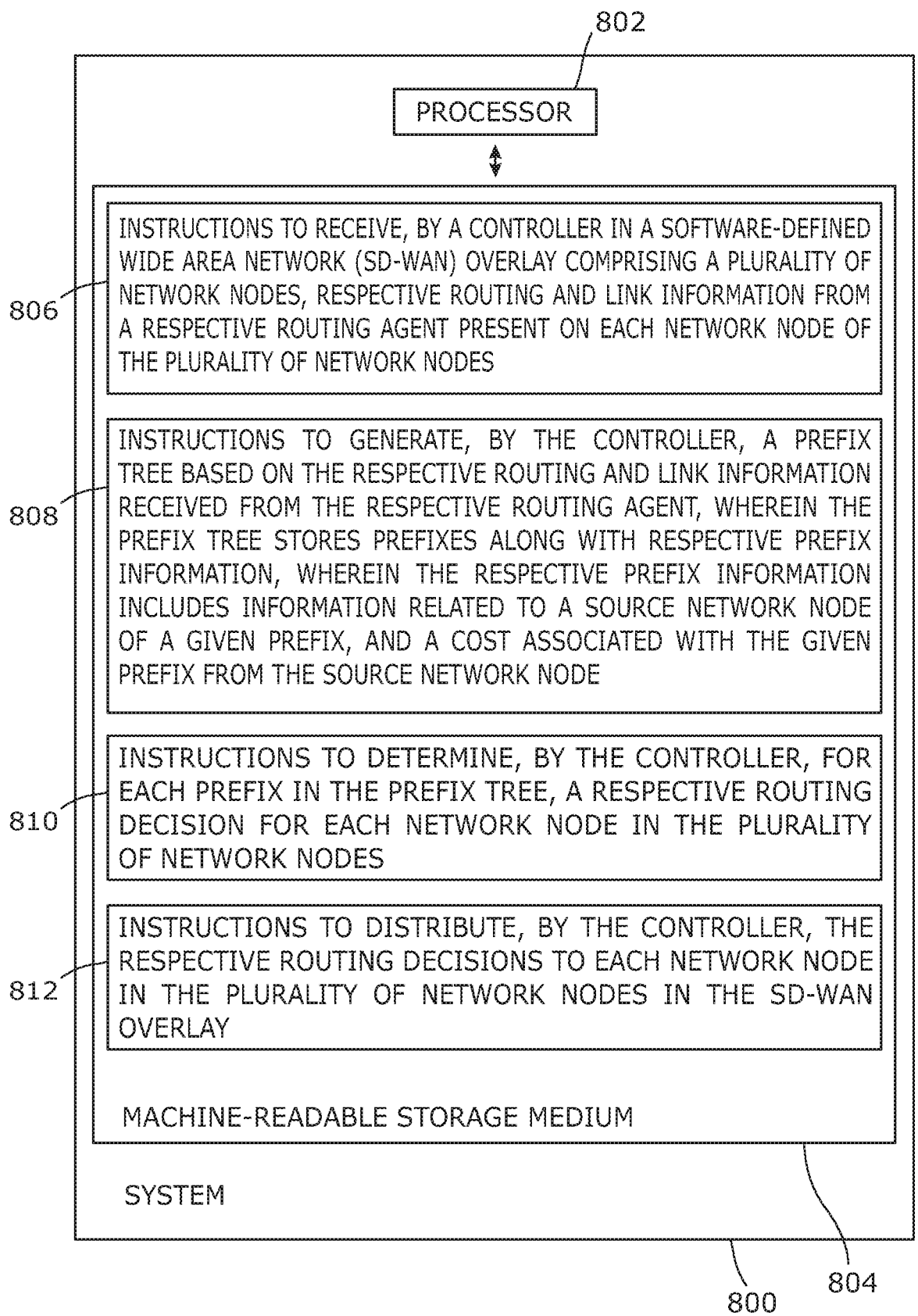
FIG. 8 is a block diagram of an example system including instructions in a machine-readable storage medium for determining routing decisions in a SD-WAN overlay.

FIG. 8 is a block diagram of an example system 800 including instructions in a machine-readable storage medium for determining routing decisions in a SD-WAN overlay.

System 800 includes a processor 802 and a machine-readable storage medium 804 communicatively coupled through a system bus. Processor 802 may be any type of Central Processing Unit (CPU), microprocessor, or processing logic that interprets and executes machine-readable instructions stored in machine-readable storage medium 804. Machine-readable storage medium 804 may be a random access memory (RAM) or another type of dynamic storage device that may store information and machine-readable instructions that may be executed by processor 802. For example, machine-readable storage medium 804 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In some examples, machine-readable storage medium 804 may be a non-transitory machine-readable medium. In some examples, machine-readable storage medium 804 may be remote but accessible to system 800.

Machine-readable storage medium 804 may store instructions 806, 808, 810, and 812. In some examples, instructions 806 may be executed by processor 802 to receive, by a controller in a software-defined Wide Area Network (SD-WAN) overlay comprising a plurality of network nodes, respective routing and link information from a respective routing agent present on each network node of the plurality of network nodes. Instructions 808 may be executed by processor 802 to generate, by the controller, a Prefix tree based on the respective routing and link information received from the respective routing agent, wherein the prefix tree stores prefixes along with respective prefix information. The respective prefix information may include information related to a source network node of a given prefix, and a cost associated with the given prefix from the source network node. Instructions 810 may be executed by processor 802 to determine, by the controller, for each prefix in the Prefix tree, a respective routing decision for each network node in the plurality of network nodes. Instructions 812 may be executed by processor 802 to distribute, by the controller, the respective routing decision to each network node in the plurality of network nodes in the SD-WAN overlay.

For the purpose of simplicity of explanation, the example method of FIG. 6 is shown as executing serially, however it is to be understood and appreciated that the present and other examples are not limited by the illustrated order. The example systems of FIGS. 1, 7, and 8, and method of FIG. 6 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
  receiving, by a controller in a software-defined wide area network (SD-WAN) overlay comprising a plurality of network nodes, respective routing and link information from a respective routing agent present on each network node of the plurality of network nodes;
  generating, by the controller, a prefix tree based on the respective routing and link information received from the respective routing agent, wherein the prefix tree stores prefixes along with respective prefix information;
  determining, by the controller, for each prefix in the prefix tree, a respective routing decision for each network node in the plurality of network nodes; and
  distributing, by the controller, the respective routing decision to each network node in the plurality of network nodes in the SD-WAN overlay.

2. The method of claim 1, wherein determining comprises:
  identifying, by the controller, for a given prefix in the prefix tree and for a given network node in the plurality of network nodes, a best cost source network node as a next hop for the given prefix from the given network node.

3. The method of claim 2, wherein identifying the best cost source network node as the next hop for the given prefix from the given network node comprises:
  determining, by the controller, a least prefix cost for the given prefix, wherein the least prefix cost for the given prefix is a least cost of reaching the given prefix from the given network node.

4. The method of claim 3, wherein determining, by the controller, the least prefix cost for the given prefix comprises:
  determining, by the controller, for each source network node of the given prefix, a prefix cost, wherein the prefix cost is a cost of reaching the given prefix from a given network node, wherein the cost of reaching the given prefix from the given network node is a sum total of a cost advertised by the given source network node and a cost of reaching the source network node from the given network node;
  comparing, by the controller, the prefix cost of each source network node; and
  identifying, by the controller, a least prefix cost source network node in response to the comparison.

5. The method of claim 1, wherein the respective prefix information includes information related to a source network node of a prefix, and a cost associated with the prefix from the source network node.

6. The method of claim 1, further comprising:
  applying, by the controller, a priority to a prefix in the prefix tree.

7. The method of claim 1, further comprising:
  applying, by the controller, a policy to a prefix in the prefix tree.

8. A controller comprising:
  a processor; and
  a memory including instructions that, when executed by the processor, cause the controller to:
    receive in a software-defined wide area network (SD-WAN) overlay comprising a plurality of network nodes, respective routing and link information from a respective routing agent present on each network node of the plurality of network nodes;
    generate a prefix tree based on the respective routing and link information received from the respective routing agent, wherein the prefix tree stores prefixes along with respective prefix information;
    determine for each prefix in the prefix tree, a respective routing decision for each network node in the plurality of network nodes; and
    distribute the respective routing decision to each network node in the plurality of network nodes in the SD-WAN overlay.

9. The controller of claim 8, wherein the source network node includes a network node that presented the prefix to the controller.

10. The controller of claim 9, wherein the cost associated with the prefix from the source network node is modified by a user.

11. The controller of claim 8, wherein each network node in the plurality of network nodes represents an Internet Protocol Security (IPSec) tunnel endpoint.

12. The controller of claim 8, wherein the memory includes instructions to store the respective routing and link information in a route database on the controller.

13. The controller of claim 8, wherein at least one of the plurality of network nodes is compliant with OpenFlow standard.

14. A non-transitory machine-readable storage medium comprising instructions, the instructions executable by a processor to:
- receive, by a controller in a software-defined wide area network (SD-WAN) overlay comprising a plurality of network nodes, respective routing and link information from a respective routing agent present on each network node of the plurality of network nodes;
- generate, by the controller, a prefix tree based on the respective routing and link information received from the respective routing agent, wherein the prefix tree stores prefixes along with respective prefix information, wherein the respective prefix information includes information related to a source network node of a given prefix, and a cost associated with the given prefix from the source network node;
- determine, by the controller, for each prefix in the prefix tree, a respective routing decision for each network node in the plurality of network nodes; and
- distribute, by the controller, the respective routing decision to each network node in the plurality of network nodes in the SD-WAN overlay.

15. The storage medium of claim 14, further comprising instructions to:
- apply, by the controller, a priority to a network node in the plurality of network nodes.

16. The storage medium of claim 14, further comprising instructions to:
- update, by the controller, a status of a prefix in the prefix tree to one of an active status and an inactive status.

17. The storage medium of claim 14, further comprising instructions to:
- update, by the controller, a link between two network nodes in the plurality of network nodes to one of an active status and an inactive status for a specific time period.

18. The storage medium of claim 14, further comprising instructions to:
- update, by the controller, a link between two network nodes in the plurality of network nodes to one of an active status and an inactive status for a specific prefix in the prefix tree.

19. The storage medium of claim 14, further comprising instructions to:
- update, by the controller, a link between two network nodes in the plurality of network nodes to one of an active status and an inactive status for a specific prefix in the prefix tree, for a specific time period.

20. The storage medium of claim 14, further comprising instructions to:
- modify, by the controller, a link cost between two network nodes in the plurality of network nodes for a specific time period.

* * * * *